Figure 3:
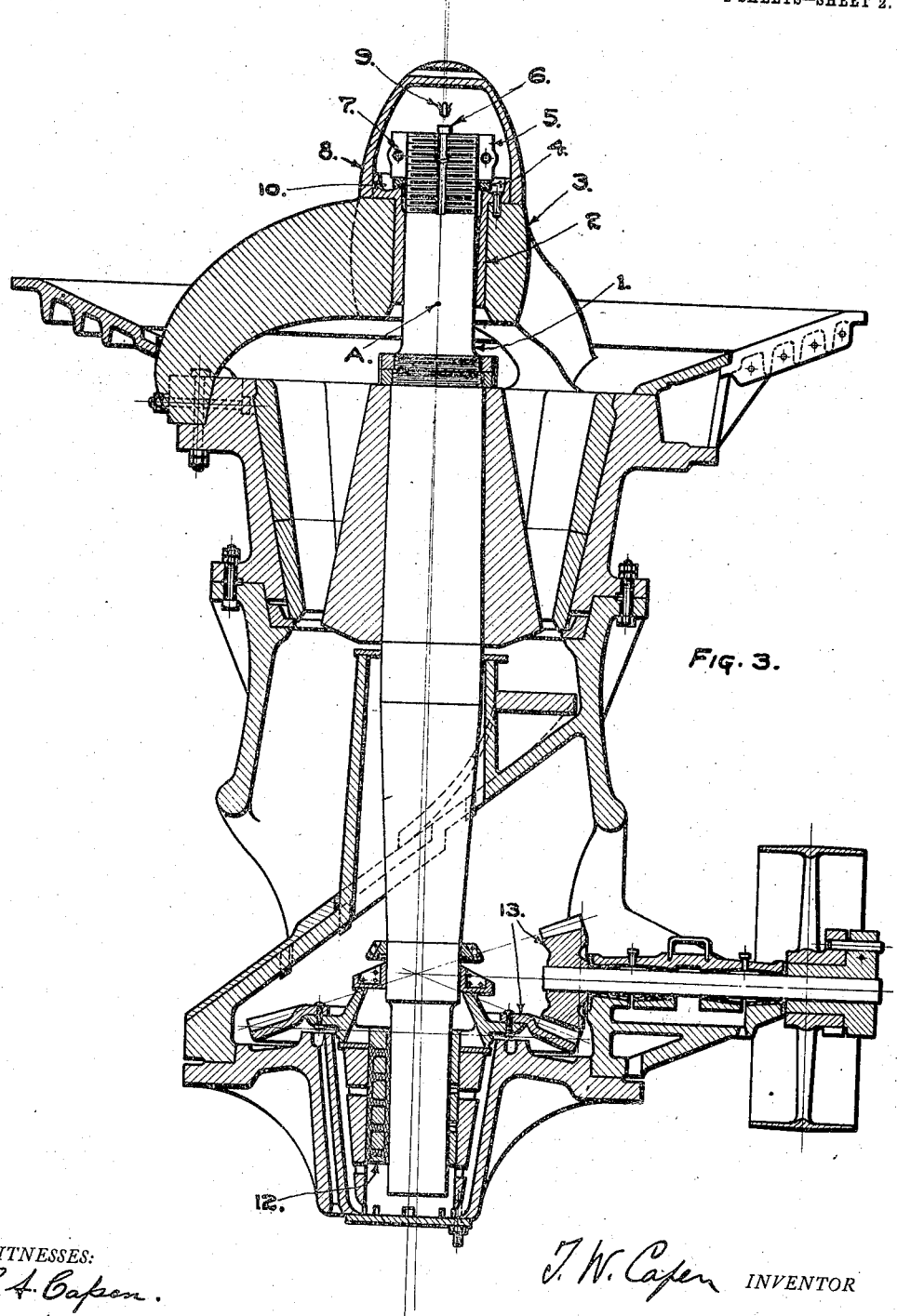

No. 867,557.
PATENTED OCT. 1, 1907.
T. W. CAPEN.
SHAFT SUSPENSION.
APPLICATION FILED OCT. 26, 1905.
2 SHEETS—SHEET 1.
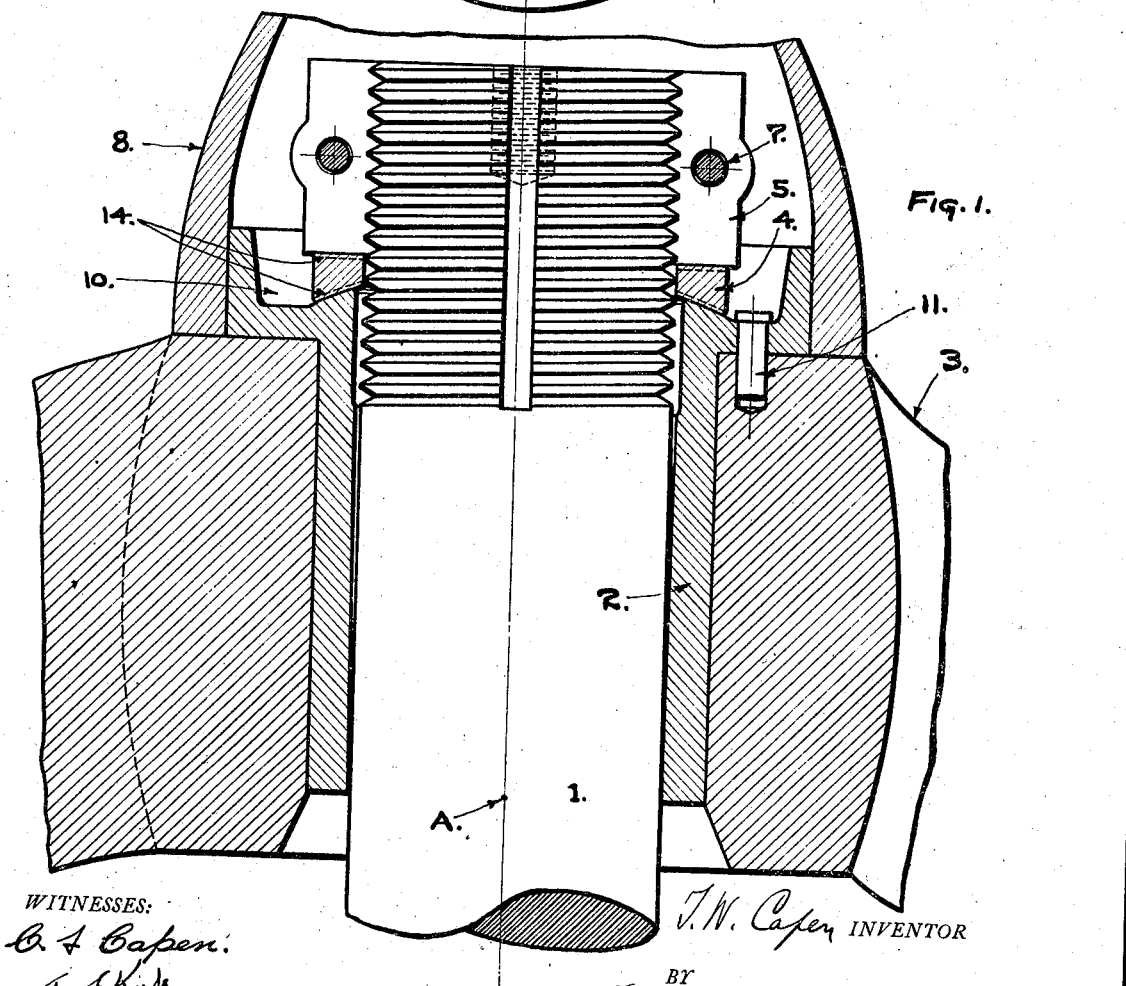

UNITED STATES PATENT OFFICE.

THOMAS W. CAPEN, OF MILWAUKEE, WISCONSIN, ASSIGNOR TO ALLIS-CHALMERS COMPANY, OF MILWAUKEE, WISCONSIN, A CORPORATION OF NEW JERSEY.

SHAFT SUSPENSION.

No. 867,557.  Specification of Letters Patent.  Patented Oct. 1, 1907.

Application filed October 26, 1905. Serial No. 284,441.

*To all whom it may concern:*

Be it known that THOMAS W. CAPEN, a citizen of the United States, residing at Milwaukee, in the county of Milwaukee and State of Wisconsin, has invented certain new and useful Improvements in Shaft Suspension, of which the following is a specification.

This invention relates to a bearing, in which provision is made to permit movements other than that of rotation between two members.

This invention has utility in structures wherein the driven shaft is suspended, and it is necessary to have a very strong upper bearing which will permit lateral or rockable movement of the shaft. Gyratory rock and ore-breakers must withstand very hard usage, and when therein applied, this bearing, besides taking care of the lateral movements, permits of a fixed low fulcrum plane for the shaft, as well as vertical adjustment for the shaft.

Referring to the drawings: Figure 1 is a sectional view of the suspension bearing. Fig. 2 is a plan view of the split nut for the shaft. Fig. 3 is a sectional elevation of a rock and ore breaker in which the suspension bearing is shown.

The shaft 1, has surrounding it the bushing 2, which bushing is fixed in the frame or fixed member 3. The fixed member 3 is shown on the drawing as a spider for supporting the upper end of the shaft of a gyratory crusher. The hub of the spider is formed with a through bore for receiving the bushing 2, and by through bore is meant such a bore through a part as would not have any shoulder within the bore, or in other words, where no counterbore is formed. The bushing or element 2, fits the inner member or shaft 1 in a plane through the fulcrum point A, thus providing a fulcrum bearing for the shaft 1. The inner surface of the bushing is tapered from this fulcrum bearing to permit relative gyration or rocking between the bushing and shaft. Struck upon an arc from the point A is the spherical zone rocking bearing surface forming a projecting upper end of the bushing or element 2. Fitting this convex bearing surface, is the bearing-ring 4, having a concave lower side and a plane upper side, in which are oil grooves 14. This bearing-ring is a loose means which will permit rocking upon the curved surface and relative rotation between its plane surface and the split supporting nut 5. This split supporting nut 5 engages a threaded portion of the shaft 1. To adjust the shaft vertically, the pin 6 is removed from the registered slots in the supporting nut 5 and shaft 1; and the bolts, 7, slacked.

A cap 8, fits the outwardly extending flange on the bushing 2. In this cap is an office 9, through which lubricant may be introduced to the channel 10 in the bushing 2. The bushing 2 is non-adjustably fixed to the frame 3 by a dowel pin 11 so that to most intents and purposes it forms a part thereof.

The shaft 1 has loosely mounted on its lower end, the eccentric 12, which is driven by gearing 13. In operation, before, under load, the friction may cause the shaft 1 to rotate with the eccentric. However, when rock is introduced, the rotation of the shaft in that direction is not only retarded, but the shaft turns in the opposite direction. It accordingly appears that this shaft has two independent motions. The bearing-ring 4 takes care of both these movements, the rocking motion caused by the eccentric on its lower curved bearing surface, and the rotation caused by the load upon its upper plane surface.

What is claimed, and it is desired to secure by Letters Patent is:

1. An outer member having a through bore, a bushing therein having an outwardly extending supporting flange at an end of the through bore, the flange having a spherical zone rocking bearing surface, and the bushing providing a fulcrum bearing, and an inner member loosely supported on the bushing and coacting with the bushing at the fulcrum bearing and at the rocking bearing.

2. A loose positively rocked member, a supporting means, a bushing coacting with the supporting means and providing a fulcrum for the member, adjusting means for the member, and a bearing ring having a plane side and a concave side interposed between the adjusting means and the bushing.

3. In an ore crusher of the class described the combination of a spider portion having a bore, a bushing portion fixed in the bore and provided with an end projecting beyond the bore for supporting the bushing portion, a gyrating shaft, a supporting means secured to the upper end of said shaft, and a loose bearing ring surrounding said shaft and resting solely upon the projecting end of the spider bushing and interposed between the projecting end of the bushing and the supporting means.

4. In a crusher, a spider portion having a through bore devoid of counterbore, a shaft suspended from the spider, a bushing fixed to the spider and extending within the bore of the spider to form for the shaft a fulcrum bearing fixedly maintained as to the spider and also extending beyond the bore of the spider to form a rocking bearing for the shaft, and adjusting means for the shaft.

In testimony whereof he affixes his signature in presence of two witnesses.

THOMAS W. CAPEN.

Witnesses:
G. F. DE WEIN,
GEO. E. KIRK.